(12) United States Patent
Aoki et al.

(10) Patent No.: US 9,251,367 B2
(45) Date of Patent: Feb. 2, 2016

(54) DEVICE, METHOD AND PROGRAM FOR PREVENTING INFORMATION LEAKAGE

(75) Inventors: Satoshi Aoki, Tokyo (JP); Manabu Kameda, Ishikawa (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 14/007,175

(22) PCT Filed: Mar. 16, 2012

(86) PCT No.: PCT/JP2012/001865
§ 371 (c)(1),
(2), (4) Date: Oct. 10, 2013

(87) PCT Pub. No.: WO2012/132296
PCT Pub. Date: Oct. 4, 2012

(65) Prior Publication Data
US 2014/0026226 A1    Jan. 23, 2014

(30) Foreign Application Priority Data
Mar. 25, 2011    (JP) .................................. 2011-067315

(51) Int. Cl.
*G06F 7/04* (2006.01)
*H04L 29/06* (2006.01)
*G06F 21/62* (2013.01)
(Continued)

(52) U.S. Cl.
CPC ............ *G06F 21/6245* (2013.01); *G06F 21/51* (2013.01); *G06F 21/6263* (2013.01); *H04L 67/02* (2013.01)

(58) Field of Classification Search
CPC ..................... H04L 63/1408; G06F 21/6245
USPC ................... 726/26, 1, 2, 22, 23; 713/201
See application file for complete search history.

(56) References Cited

U.S. PATENT DOCUMENTS

| | | | |
|---|---|---|---|
| 7,146,505 B1 * | 12/2006 | Harada | G06Q 20/206 705/18 |
| 7,860,988 B2 * | 12/2010 | Aoki | H04L 47/10 709/219 |
| 7,966,372 B1 * | 6/2011 | Tomkow | G06Q 10/107 709/203 |

(Continued)

FOREIGN PATENT DOCUMENTS

| | | | |
|---|---|---|---|
| JP | 2005-044277 A | 2/2005 | |
| JP | 2005-134995 A | 5/2005 | |
| JP | 2010-020728 A | 1/2010 | |

*Primary Examiner* — Abu Sholeman
(74) *Attorney, Agent, or Firm* — Sughrue Mion, PLLC

(57) ABSTRACT

Provided is a device for preventing information leakage including: a storage unit that stores message time, request source information, and request destination information in relation to each information requesting message; a unit that suspends a response message containing personal information in response messages in response to the information requesting messages, for a predetermined suspended time from a message time of the corresponding information requesting message; a unit that counts the number of information requesting messages transmitted from the same request source to the same destination and corresponding to the suspended response message on the basis of information stored in the storage unit; and a unit that, in the case where the counted number of the information requesting messages exceeds a predetermined threshold value, applies a protection process to the suspended response message so that the personal information contained in the suspended response message is not received by the request source.

12 Claims, 11 Drawing Sheets

(51) Int. Cl.
*G06F 21/51* (2013.01)
*H04L 29/08* (2006.01)

(56) References Cited

U.S. PATENT DOCUMENTS

| | | | | |
|---|---|---|---|---|
| 2002/0143933 A1* | 10/2002 | Hind | G06Q 30/02 | |
| | | | | 709/224 |
| 2003/0145236 A1* | 7/2003 | Tateoka | H04L 63/1408 | |
| | | | | 726/12 |
| 2003/0154296 A1* | 8/2003 | Noguchi | H04L 63/0236 | |
| | | | | 709/229 |
| 2003/0182367 A1* | 9/2003 | Ohara | G06F 3/1204 | |
| | | | | 709/203 |
| 2005/0022000 A1* | 1/2005 | Inomata et al. | | 713/200 |
| 2006/0226950 A1* | 10/2006 | Kanou | G06F 21/10 | |
| | | | | 340/5.61 |
| 2008/0086434 A1* | 4/2008 | Chesla | G06N 5/048 | |
| | | | | 706/12 |
| 2008/0281699 A1* | 11/2008 | Whitehead | G06Q 30/02 | |
| | | | | 705/14.41 |
| 2010/0266129 A1* | 10/2010 | Tsuchiya | H04L 63/0428 | |
| | | | | 380/278 |
| 2011/0185436 A1* | 7/2011 | Koulinitch | G06F 21/6218 | |
| | | | | 726/28 |
| 2013/0042319 A1* | 2/2013 | Lin | H04L 63/1458 | |
| | | | | 726/22 |

* cited by examiner

FIG. 3

| MESSAGE TIME | REQUEST DESTINATION INFORMATION (URL) | REQUEST SOURCE INFORMATION (IP ADDRESS) |
|---|---|---|
| 2011.3.16-09:13:25 | www.sample.com/secret/individual | 202.192.34.45 |
| 2011.3.16-09:13:30 | www.sample.com/top/manual | 211.185.3.23 |
| 2011.3.16-09:13:31 | www.sample.com/secret/individual | 202.192.34.45 |
| 2011.3.16-09:13:32 | www.sample.com/secret/individual | 202.192.34.45 |
| 2011.3.16-09:13:33 | www.sample.com/secret/individual | 202.192.34.45 |
| ⋮ | ⋮ | ⋮ |

FIG. 4

| REQUEST DESTINATION INFORMATION (URL) | PERSONAL INFORMATION TYPE |
|---|---|
| www.sample.com/secret/individual | TELEPHONE NUMBER |
| www.sample.com/secret/individual | NAME |
| www.sample.com/secret/individual | CREDIT CARD NUMBER |
| www.example.com/info/private | ADDRESS |
| www.example.com/info/private | ACCOUNT NUMBER |
| ⋮ | ⋮ |

DEVICE, METHOD AND PROGRAM FOR PREVENTING INFORMATION LEAKAGE

CROSS REFERENCE TO RELATED APPLICATIONS

This is a National Stage of International Application No. PCT/JP2012/001865, filed Mar. 16, 2012, claiming priority from Japanese Patent Application No. 2011-067315, filed Mar. 25, 2011, the contents of all of which are incorporated herein by reference in their entirety.

TECHNICAL FIELD

The present invention relates to a technique for preventing leakage of personal information through a communication.

BACKGROUND ART

In recent years, problems have arisen concerning unauthorized activities of acquiring personal information from WEB application systems through maliciously attacking vulnerability in WEB applications. To address these problems, proposal has been made of a system of detecting attack patterns to the WEB applications and blocking the attack using, for example, web application firewall (WAF) to prevent leakage of personal information.

Further, a technique of diagnosing vulnerable portions in the WEB application in advance is proposed to improve the security of the WEB application. For example, Patent Document 1 below proposes to identify an inspection item corresponding to a given parameter using a setting file indicating a correspondence between parameters to be inspected and inspection items when the parameter is given, thereby performing the inspection process in terms of vulnerability.

RELATED DOCUMENT

Patent Document

Patent Document 1: Japanese Patent Application Laid-open No. 2005-134995

SUMMARY OF THE INVENTION

However, with the method described above, it is difficult to prevent an authorized user or a user masquerading the authorized user from collecting the large amount of personal information with the intention of fraud. Further, although it is possible to identify the user who acquires the large amount of personal information using log information of the database storing the personal information, it is impossible to prevent the leakage of the personal information itself.

In view of the circumstances described above, the present invention provides a technique of preventing the leakage of the personal information through the communication before it happens.

The present invention has aspects employing the following configurations to solve the problem described above.

A first aspect of the present invention relates to a device for preventing information leakage. The device for preventing information leakage according to the first aspect includes: a request information storage unit that stores a message time, request source information, and request destination information in relation to each information requesting message transmitted from a client terminal to a server device; a suspending processing unit that suspends a response message containing personal information in response messages transmitted from the server device in response to the information requesting messages, for a predetermined suspended time from a message time of the corresponding information requesting message; a counting unit that, on the basis of information concerning the information requesting message stored in the request information storage unit, counts the number of information requesting messages transmitted from the same request source to the same request destination and corresponding to the suspended response message; and a response processing unit that, in the case where the number of the information requesting messages counted by the counting unit exceeds a predetermined threshold value, applies a protection process to the suspended response message so that the personal information contained in the suspended response message is not received by the client terminal serving as the request source.

A second aspect of the present invention relates to a method for preventing information leakage. In the method for preventing information leakage according to the second aspect, a computer: stores, in a request information storage unit, a message time, request source information, and request destination information in relation to each information requesting message transmitted from a client terminal to a server device; suspends a response message containing personal information in response messages transmitted from the server device in response to the information requesting messages, for a predetermined suspended time from a message time of the corresponding information requesting message; counts the number of information requesting messages transmitted from the same request source to the same request destination and corresponding to the suspended response message, on the basis of information concerning the information requesting message stored in the request information storage unit; and in a case where the counted number of the information requesting messages exceeds a predetermined threshold value, applies a protection process to the suspended response message so that the personal information contained in the suspended response message is not received by the client terminal serving as the request source.

A third aspect of the present invention relates to a device for preventing information leakage. The device for preventing information leakage according to the third aspect includes: a suspending processing unit that suspends a response message containing personal information in response messages transmitted from a server device in response to information requesting messages transmitted from a client terminal to the server device, for a predetermined suspended time from a message time related to each response message; a counting unit that counts the number of response messages related to the same request source and the same request destination in the suspended response message; and a response processing unit that, in a case where the number of the response messages counted by the counting unit exceeds a predetermined threshold value, applies a protection process to the suspended response message so that the personal information contained in the suspended response message is not received by the client terminal serving as the request source.

A fourth aspect of the present invention relates to a method for preventing information leakage. In the method for preventing information leakage according to the fourth aspect, a computer: suspends a response message containing personal information in response messages transmitted from a server device in response to information requesting messages transmitted from a client terminal to the server device, for a predetermined suspended time from a message time related to each response message; counts the number of response messages related to the same request source and the same request destination in the suspended response message; and in the case where the counted number of the response messages exceeds a predetermined threshold value, applies a protection process to the suspended response message so that the personal information contained in the suspended response message is not received by the client terminal serving as the request source.

Another aspect of the present invention may include a program that causes a computer to realize each of the configurations of the first aspect or the second aspect, or a computer-readable storage medium that stores such a program. This storage medium includes a non-transitory tangible medium.

According to the aspects described above, it is possible to provide the technique of preventing the leakage of the personal information through the communication before it happens.

BRIEF DESCRIPTION OF THE DRAWINGS

FIG. 3 is a diagram illustrating an example of a request information storage unit.

FIG. 4 is a diagram illustrating an example of a personal information identity storage unit.

DESCRIPTION OF EMBODIMENTS

Figure 1:
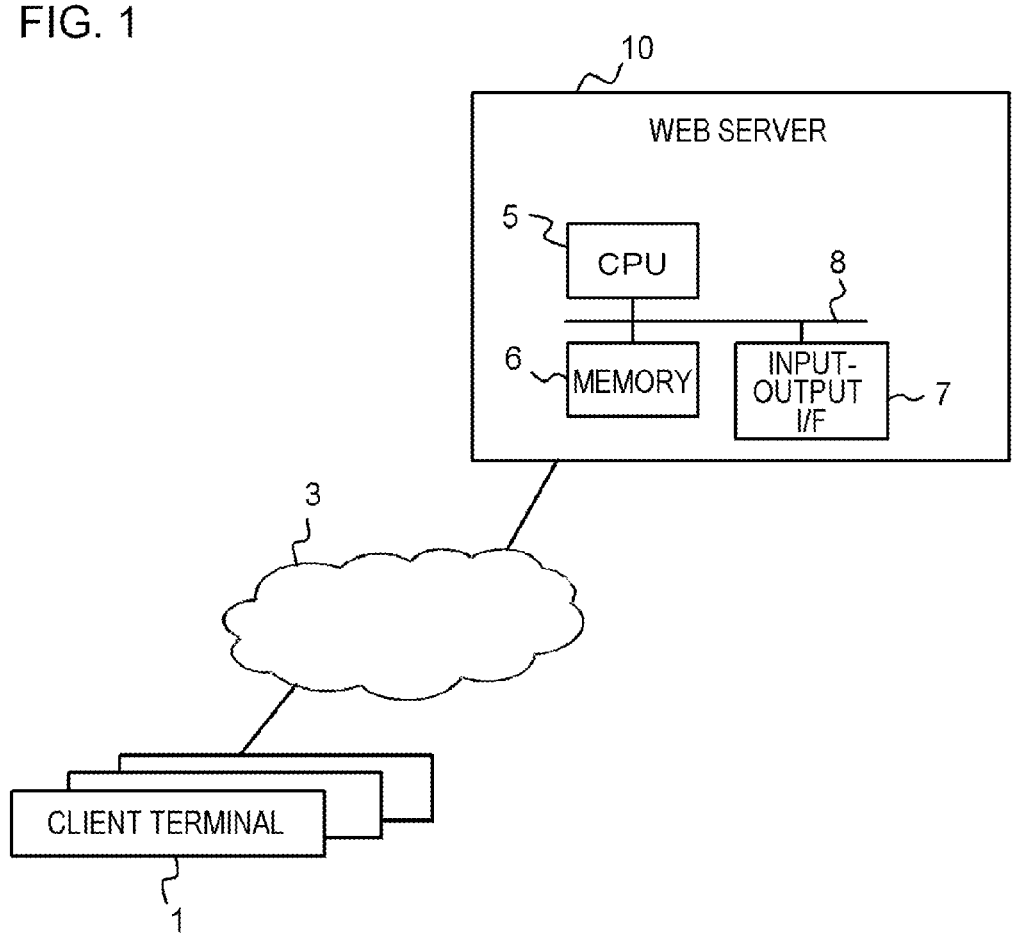
FIG. 1 is a schematic view illustrating an example of a configuration of a WEB system including a WEB server device (WEB server) according to a first exemplary embodiment.

Below, exemplary embodiments of the present invention will be described. Note that the exemplary embodiments described below are merely examples, and the present invention is not limited to the configurations of the exemplary embodiments below.

A device for preventing information leakage according to this exemplary embodiment, includes: a request information storage unit that stores a message time, request source information, and request destination information in relation to each information requesting message transmitted from a client terminal to a server device; a suspending processing unit that suspends a response message containing personal information in response messages transmitted from the server device in response to the information requesting messages, for a predetermined suspended time from a message time of the corresponding information requesting message; a counting unit that, on the basis of information concerning the information requesting message stored in the request information storage unit, counts the number of information requesting messages transmitted from the same request source to the same request destination and corresponding to the suspended response message; and a response processing unit that, in the case where the number of the information requesting messages counted by the counting unit exceeds a predetermined threshold value, applies a protection process to the response message so that the personal information contained in the suspended response message is not received by a client terminal serving as the request source.

In this exemplary embodiment, the response message containing the personal information is suspended for the predetermined suspended time from the message time of the corresponding information requesting message, and in the case where the number of the information requesting messages corresponding to the suspended response message and transmitted from the same request source to the same request destination exceeds the predetermined threshold value, the protection process is applied to this response message so that the personal information contained in the response message is not received by the client terminal serving as the request source. In other words, in this exemplary embodiment, in the case where, during the predetermined suspended time, the information requesting message requesting the response message containing the personal information is transmitted from the same request source such that the number of the information requesting messages exceeds the predetermined threshold value, such a information requesting message is judged to be an unauthorized request. As a result, processing is performed such that the personal information transmitted from the server device in response to the unauthorized request is not transmitted to the request source.

If the large number of the information requesting messages corresponding to the response message containing the personal information is transmitted from the same request source during a certain period of time, it is highly likely that this transmission is the unauthorized access. With the device for preventing information leakage according to this exemplary embodiment, it is possible to precisely detect such an unauthorized access, and prevent the leakage of the personal information before it happens.

Below, the exemplary embodiment above will be described in more detail. The following exemplary embodiments are given as an example in which the above-described device for preventing information leakage is applied to the WEB system. Note that the above-described device for preventing information leakage is applicable not only to the WEB system, but also to various modes in which the personal information is transferred or received through the communication.

[First Exemplary Embodiment]
[System Configuration]

FIG. 1 is a schematic view illustrating an example of a configuration of a WEB system including a WEB server device (hereinafter, simply referred to as a WEB server) 10 according to a first exemplary embodiment. The WEB server 10 according to the first exemplary embodiment is connected through a network 3 to plural client terminals 1 in a manner that they can communicate with each other. The network 3 includes, for example, a public network such as the Internet, a wide area network (WAN), a local area network (LAN), and a wireless communication network. This exemplary embodiment does not limit the form of connection and the form of communication between the WEB server 10 and each of the client terminals 1.

The WEB server 10 may be configured by a general purpose computer such as a general-type personal computer (PC), or may be configured by a dedicated computer. FIG. 1 illustrates an example of a hardware configuration of the WEB server 10. As a hardware configuration, the WEB server 10 has, for example, a central processing unit (CPU) 5, a memory 6, and an input-output interface (I/F) 7, each of which is connected, for example, through a bus 8. The memory 6 includes, for example, a random access memory (RAM), a read only memory (ROM), a hard disk, and a portable storage medium. The input-output I/F 7 is connected, for example, to a communication device that communicates through the network 3 with each of the client terminals 1. Further, the input-output I/F 7 may be connected to a user interface device such as a display device and an input device. Note that this exemplary embodiment does not limit the hardware configuration of the WEB server 10.

Each of the client terminals 1 is a general-type information processing terminal such a PC, a mobile PC, and a mobile phone. It is only necessary for each client terminal 1 to have a general communication function capable of accessing the WEB server 10 and receiving data, and a general user interface function capable of displaying and manipulating a screen based on the data provided from the WEB server 10. This exemplary embodiment gives an example in which the WEB system is used as an interface between the WEB server 10 and the client terminal 1, and hence, each client terminal 1 has a so-called WEB browser as the user interface function and the communication function of executing a hypertext transfer protocol (HTTP). Note that this exemplary embodiment does not apply any limitation on the hardware configuration and the functional configuration of each client terminal 1.

The client terminals 1 include a terminal to be manipulated by a user (hereinafter, referred to as an unauthorized user) who attempts to acquire the vast amount of personal information from the WEB server 10 in an unauthorized manner. In this exemplary embodiment, the unauthorized user uses at least one client terminal 1 to attack the WEB server 10 maliciously using the HTTP. This attack includes, for example, an attack called a structured query language (SQL) injection.

[Device Configuration]

Figure 2:
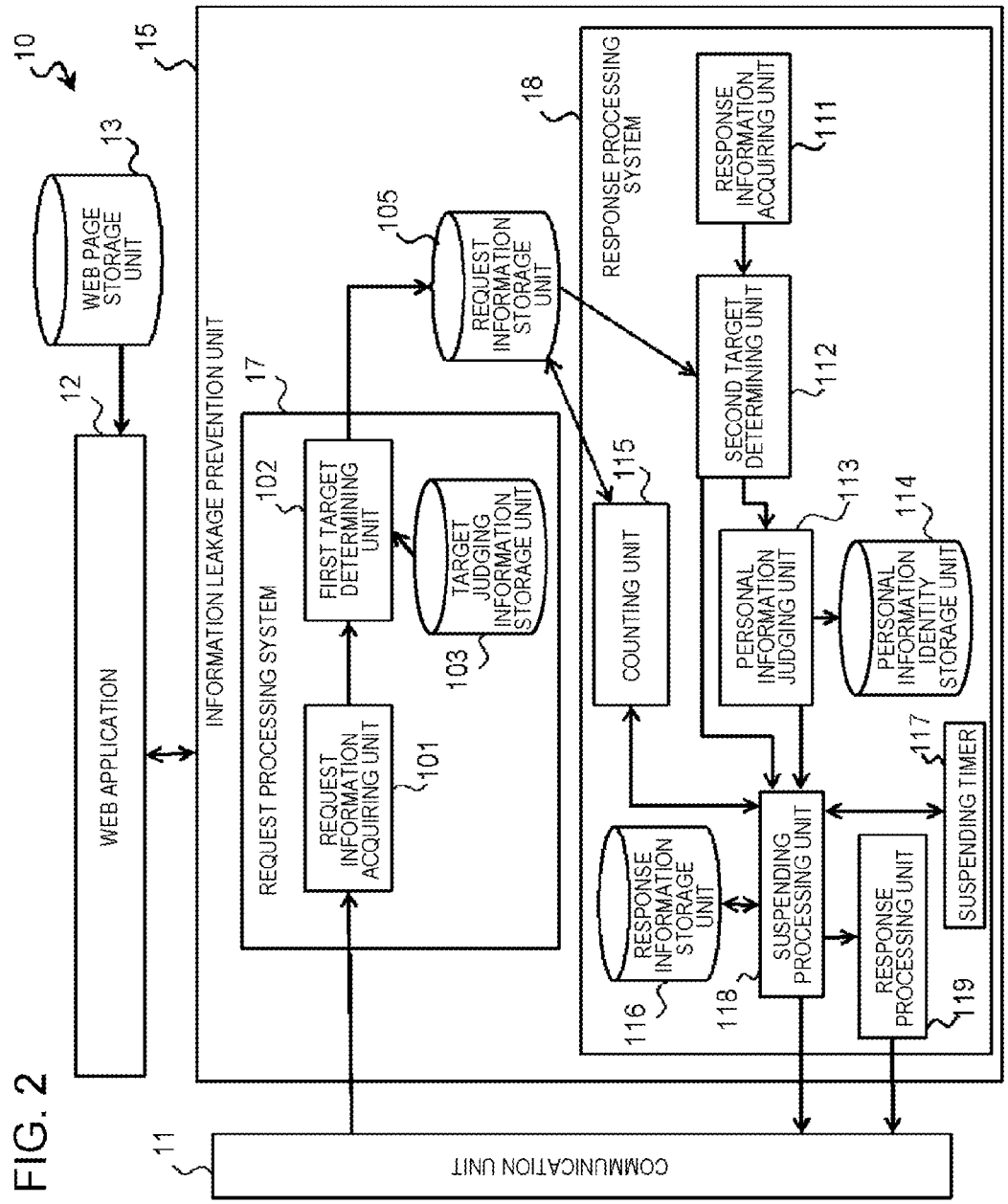
FIG. 2 is a schematic view illustrating an example of a configuration of the WEB server according to the first exemplary embodiment.

FIG. 2 is a schematic view illustrating an example of a configuration of the WEB server 10 according to the first exemplary embodiment. As illustrated in FIG. 2, the WEB server 10 according to the first exemplary embodiment includes, for example, a communication unit 11, a WEB application 12, a WEB page storage unit 13, and an information leakage prevention unit 15. Each of the processing units is realized as a software configuration element, which is a software component (segment) such as a task, a process, a function, and a data storage area. Thus, each of the processing units is realized, for example, with the CPU 5 illustrated in FIG. 1 running a program stored in the memory 6. The WEB page storage unit 13 is realized on the memory 6.

The communication unit 11 controls, for example, a network interface card serving as the input-output I/F 7 to transmit or receive data with the client terminals 1 in accordance with a protocol such as the HTTP. For example, the communication unit 11 receives data on, for example, a WEB page transmitted from the WEB application 12 or the information leakage prevention unit 15, and transmits a HTTP packet containing the data to the client terminal 1. Further, upon receiving the HTTP packet transmitted from the client terminal 1, the communication unit 11 transmits the data contained in the HTTP packet to the WEB application 12 or the information leakage prevention unit 15.

It should be noted that this exemplary embodiment gives an example in which the WEB system is used as the interface between the WEB server 10 and the client terminal 1, and hence, the explanation is mainly made of the data transmitted or received through the HTTP. However, the communication unit 11 can perform other communication protocols.

Hereinafter, for the purpose of description, the HTTP packet transmitted from the client terminal 1 for requesting a given WEB page is referred to as a HTTP request. In general, this HTTP request is also called an information requesting message. The HTTP request contains, as the request source information, information such as a IP address for identifying the client terminal 1, which is the request source, and contains, as the request destination information, uniform resource locator (URL) information for identifying a desired WEB page or other information.

Further, a series of HTTP packets transmitted from the WEB server 10 and providing information requested by the client terminal 1 are referred to as a HTTP response. This HTTP response may be formed by plural HTTP packets, for example, in the case where the amount of data of the information provided is large. In general, the HTTP response may be called a response message. The HTTP response includes the request source information and the request destination information contained in the corresponding HTTP request as well as information identified with the request destination information.

The WEB application 12 has a known general-type WEB server function. For example, the WEB application 12 extracts, from the WEB page storage unit 13, data requested through the HTTP request from the client terminal 1, and transmits the HTTP response containing the data to the client terminal 1 through the communication unit 11.

The WEB page storage unit 13 stores plural WEB pages and various kinds of data constituting the WEB pages. In particular, in this exemplary embodiment, the WEB page storage unit 13 stores a large amount of personal information.

The information leakage prevention unit 15 corresponds to the device for preventing information leakage in the exemplary embodiment described above. In this exemplary embodiment, the information leakage prevention unit 15 is provided between the communication unit 11 and the WEB application 12. The information leakage prevention unit 15 includes, for example, a request information acquiring unit 101, a first target determining unit 102, a target judging information storage unit 103, a request information storage unit 105, a response information acquiring unit 111, a second target determining unit 112, a personal information judging unit 113, a personal information identity storage unit 114, a counting unit 115, a response information storage unit 116, a suspending timer 117, a suspending processing unit 118, and a response processing unit 119. Each of the processing units that the information leakage prevention unit 15 has is realized as the software configuration element.

The request information acquiring unit 101, the first target determining unit 102, and the target judging information storage unit 103 perform processing related to the HTTP request, and hence, are also referred to as request processing system 17. Further, the processing units other than the request processing system 17 and the request information storage unit 105 perform processing related to the HTTP response, and hence, are also referred to as response processing system 18.

The request information storage unit 105 is shared by the request processing system 17 and the response processing system 18.

<Request Processing System 17>

The request information acquiring unit 101 acquires information concerning the HTTP request received by the communication unit 11. The request information acquiring unit 101 may acquire the information concerning the HTTP request from the communication unit 11, or may acquire, from the WEB application 12, the information concerning the HTTP request transmitted from the communication unit 11 to the WEB application 12. Further, the request information acquiring unit 101 may acquire the packet data themselves constituting the HTTP request, or may acquire the message time, the request source information, and the request destination information concerning the HTTP request. The message time indicates, for example, a point in time (date and time information) when the HTTP request is received by the WEB server 10. In the case where the HTTP request contains information on a transmission time, it may be possible to use the transmission time as the message time. The request source information is, for example, an IP address of the client terminal 1 as described above. The request destination information is, for example, a URL as described above.

The first target determining unit 102 determines a HTTP request to be inspected in the information leakage prevention unit 15 as an inspection target, and stores, in the request information storage unit 105, only the information acquired by the request information acquiring unit 101 in relation to the HTTP request determined to be the inspection target. More specifically, the first target determining unit 102 determines a HTTP request containing request destination information that matches the request destination information stored in the target judging information storage unit 103 to be the inspection target in information concerning the HTTP request acquired by the request information acquiring unit 101. The first target determining unit 102 does not store, in the request information storage unit 105, information concerning the HTTP request that does not contain the request destination information stored in the target judging information storage unit 103.

The target judging information storage unit 103 stores the request destination information for narrowing down the HTTP request to be inspected in the information leakage prevention unit 15. The information for narrowing down includes, for example, request destination information (URL) for identifying the WEB page containing the personal information. Note that, in this exemplary embodiment, this limiting information is not only the URL. This limiting information may be the IP address of the WEB server 10, or may be other information such as a parameter value attached to the URL.

Further, the request destination information stored in the target judging information storage unit 103 may be data outputted from a diagnosing device (not illustrated) that diagnoses whether the personal information is contained in the HTTP responses of the WEB server 10 or the WEB pages. With this configuration, it is possible to easily generate information to be stored in the target judging information storage unit 103.

The request information storage unit 105 stores the message time, the request source information, and the request destination information concerning the HTTP request judged by the first target determining unit 102 to be the inspection target. FIG. 3 is a diagram illustrating an example of the request information storage unit 105. In the example illustrated in FIG. 3, the URL is stored as the request destination information, and the IP address of the client terminal 1 that transmits the HTTP request is stored as the request source information.

<Response Processing System 18>

The response information acquiring unit 111 acquires data concerning the HTTP response generated by the WEB application 12 in relation to the HTTP request processed in the request processing system 17 as described above. The response information acquiring unit 111 may acquire the data concerning the HTTP response from the WEB application 12, or may acquire, from the communication unit 11, the data concerning the HTTP response transmitted from the WEB application 12 to the communication unit 11 before the communication unit 11 outputs them to the network 3. The data concerning the HTTP response represents, for example, WEB page data contained in the HTTP response, address information of the HTTP response, and information for identifying the HTTP request corresponding to the HTTP response. The information for identifying the HTTP request corresponding to the HTTP response includes, for example, a request number, the request destination information such as the URL, and a parameter.

The second target determining unit 112 identifies a HTTP response to be inspected in the information leakage prevention unit 15 from among the HTTP responses acquired by the response information acquiring unit 111, and determines HTTP responses other than the identified HTTP response, to be HTTP responses outside the inspection target. The data on the HTTP response outside the inspection target determined as described above are not subjected to the judging process in the personal information judging unit 113, are not suspended in the suspending processing unit 118, and are transmitted to the network 3 through the communication unit 11.

On the other hand, the second target determining unit 112 transmits the data on the identified HTTP response to the personal information judging unit 113. The identification of the HTTP response to be inspected is made by judging whether the request source information and the request destination information each matching the request source information (address information) and the request destination information (information on the source of response) contained in the data are stored in the request information storage unit 105.

The personal information judging unit 113 judges whether the HTTP response transmitted from the second target determining unit 112 contains the personal information. More specifically, for each type of personal information stored in the personal information identity storage unit 114, the personal information judging unit 113 sequentially judges whether personal information belonging to each of the types is contained in the data of the HTTP response. For example, the personal information judging unit 113 has a judging logic for each type of personal information, and executes the judging logic according to the personal information type determined by the personal information identity storage unit 114. The personal information judging unit 113 transmits the data of the HTTP response as well as the information indicating whether the personal information is contained, to the suspending processing unit 118.

FIG. 4 is a diagram illustrating an example of the personal information identity storage unit 114. As illustrated in FIG. 4, for each request destination, the personal information identity storage unit 114 stores the personal information types to be inspected. In the example illustrated in FIG. 4, the personal information judging unit 113 has judging logics for detecting the telephone number, the name, the credit card number, the address, and the account number, and executes each of the judging logics for detecting the telephone number, the name, and the credit card number for the HTTP response containing the request destination information "www.sample.com/secret/individual." The personal information has a data pattern determined to some degree according to types of the personal information. Thus, for example, each of the judging logics detects the data pattern from the data of the HTTP response through known pattern matching techniques.

On the basis of the information concerning the HTTP request stored in the request information storage unit 105, the counting unit 115 counts the number of HTTP requests transmitted from the same request source to the same request destination and corresponding to the HTTP responses suspended by the suspending processing unit 118. In other words, the counting unit 115 counts the number of HTTP requests corresponding to the HTTP responses containing the personal information in the HTTP requests corresponding to the information stored in the request information storage unit 105. Note that the number of HTTP requests is equivalent to the number of records stored in the request information storage unit 105 (see FIG. 3).

The response information storage unit 116 stores the data of the HTTP response suspended so as not to be received by the client terminal 1 serving as the destination.

The suspending timer 117 measures the elapsed time from the message time in relation to each of the HTTP requests corresponding to the suspended HTTP responses. If the elapsed time is more than or equal to a predetermined suspended time retained in advance, the suspending timer 117 notifies the suspending processing unit 118 of the request source information and the request destination information of the target HTTP request, and further notifies the suspending processing unit 118 to that effect.

The suspending processing unit 118 stores the data of the HTTP response in the response information storage unit 116 to suspend the HTTP response judged by the personal information judging unit 113 to contain the personal information. During the time when the data of the HTTP response is being stored in the response information storage unit 116, the HTTP response is not transmitted from the communication unit 11 to the network 3. On the other hand, the suspending processing unit 118 transmits the HTTP response judged by the personal information judging unit 113 that no personal information is contained, to the network 3 through the communication unit 11 without suspending it.

After storing the data of the HTTP response in the response information storage unit 116, the suspending processing unit 118 instructs the counting unit 115 to count the number of the HTTP requests having the request source information and the request destination information concerning this HTTP response. If the number of the HTTP requests counted by the counting unit 115 in response to this instruction exceeds a predetermined threshold value retained in advance, the suspending processing unit 118 extracts the data of this HTTP response from the response information storage unit 116, and transmits the extracted data to the response processing unit 119. At this time, the suspending processing unit 118 deletes the extracted data of the HTTP response from the response information storage unit 116.

Further, upon receiving, from the suspending timer 117, a notification that the predetermined suspended time elapses, the suspending processing unit 118 instructs the counting unit 115 to count the number of HTTP requests having the request source information and the request destination information notified by the suspending timer 117. If the number of the HTTP requests counted by the counting unit 115 in response to the instruction described above does not exceed the predetermined threshold value retained in advance, the suspending processing unit 118 cancels the suspension of the HTTP response corresponding the HTTP request for which the predetermined suspended time elapses, and deletes the information on this HTTP request from the request information storage unit 105.

The cancellation of the suspension of the HTTP response is made such that the suspending processing unit 118 extracts the data of the target HTTP response from the response information storage unit 116, and transmits the target HTTP response through the communication unit 11 to the network 3. The suspending processing unit 118 deletes the extracted data of the HTTP response from the response information storage unit 116. With this operation, even in the case where plural HTTP requests for requesting the HTTP responses containing the personal information are transmitted from one client terminal, it is possible to determine the plural HTTP requests to be valid if the number of the HTTP requests within the predetermined suspended time does not exceed the predetermined threshold value, and deliver the HTTP responses containing the personal information corresponding to the HTTP requests to the client terminal 1 serving as the source without applying any processing.

Upon receiving the data on the HTTP response from the suspending processing unit 118 in the state where the number of the HTTP requests counted by the counting unit 115 exceeds the predetermined threshold value, the response processing unit 119 applies a protection process to the data so that the personal information contained in the data is not received by the client terminal 1 serving as the request source. This protection process may be performed by cancelling the transmission of the HTTP response, or may be performed by replacing the personal information in the HTTP response with other data.

[Example of Operation]

Below, an example of an operation performed by the information leakage prevention unit 15 according to the first exemplary embodiment will be described separately for the request processing system 17 and the response processing system 18.

Figure 5:
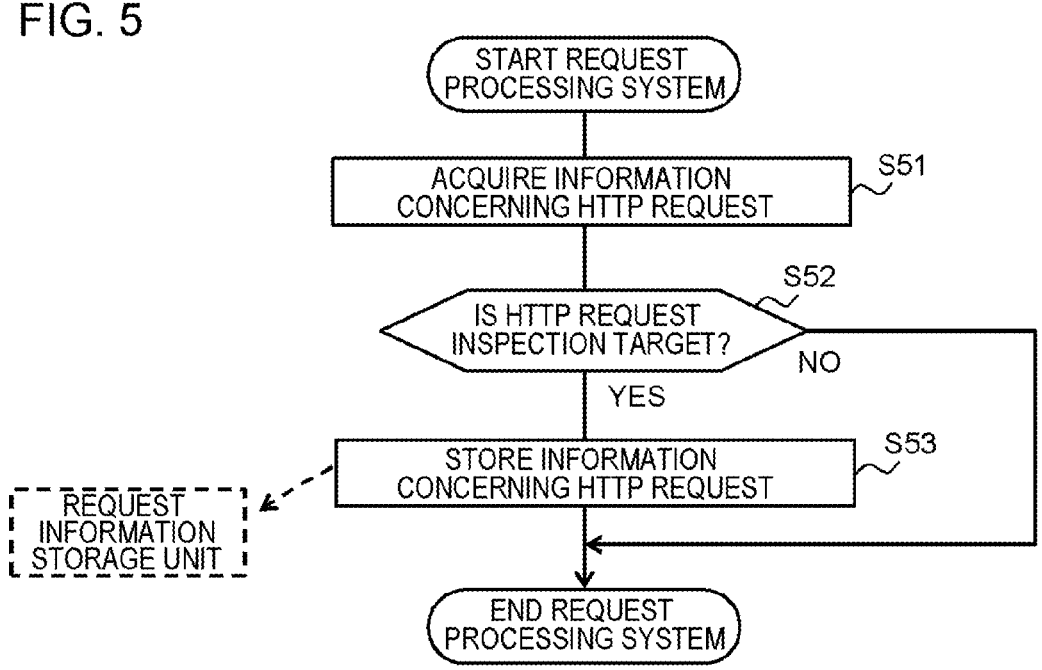
FIG. 5 is a flowchart showing an example of an operation of a request processing system of an information leakage prevention unit according to the first exemplary embodiment.

FIG. 5 is a flowchart showing an example of an operation performed by the request processing system 17 of the information leakage prevention unit 15 according to the first exemplary embodiment. Once the HTTP request is transferred from the client terminal 1 to the WEB server 10, the communication unit 11 of the WEB server 10 receives this HTTP request. With this operation, the request information acquiring unit 101 of the request processing system 17 acquires information concerning the HTTP request received by the communication unit 11 (S51). The information acquired here includes the message time, the request source information (address information on the client terminal 1), and the request destination information (URL information) related to the HTTP request.

Next, the first target determining unit 102 compares the information acquired by the request information acquiring unit 101 with information stored in the target judging information storage unit 103 to judge whether to set the HTTP request to the inspection target (S52). For example, if the URL information contained in the HTTP request matches the URL information stored in the target judging information storage unit 103, the judgment that the HTTP request should be set to the inspection target is made.

If it is determined that the HTTP request should be set to the inspection target (S52; YES), the first target determining unit 102 stores the information acquired by the request information acquiring unit 101 in the request information storage unit 105 (S53). On the other hand, if it is determined that the HTTP request should not be set to the inspection target (S52; NO), the first target determining unit 102 does not store the information in the request information storage unit 105.

Next, an example of an operation performed by the response processing system 18 of the information leakage prevention unit 15 according to the first exemplary embodiment will be made with reference to FIG. 6 and FIG. 7.

Figure 6:
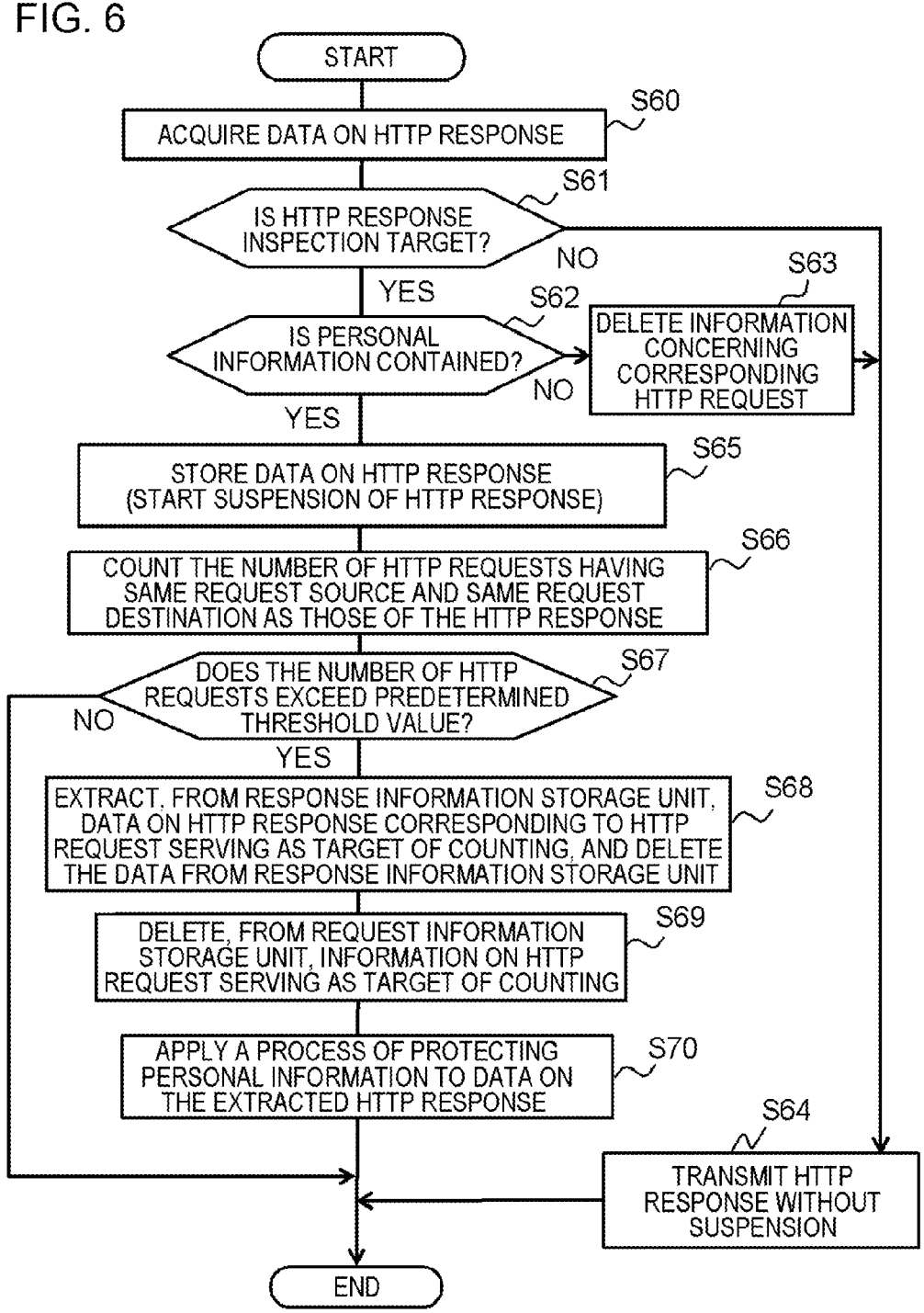
FIG. 6 is a flowchart showing an example of an operation performed by the information leakage prevention unit according to the first exemplary embodiment at the time of acquiring data on a HTTP response.

FIG. 6 is a flowchart showing an example of an operation performed by the information leakage prevention unit 15 according to the first exemplary embodiment at the time of acquiring data on a HTTP response. In the WEB server 10, once the HTTP request as described above is received, the WEB application 12 generates a corresponding HTTP response.

In the information leakage prevention unit 15, the response information acquiring unit 111 acquires data of the generated HTTP response (S60).

Next, the second target determining unit 112 compares the data acquired by the response information acquiring unit 111 with the information stored in the request information storage unit 105 to judge whether to set the HTTP response to the inspection target (S61). More specifically, in this comparison, it is judged whether or not a pair of the request source information (address information on the client terminal 1 serving as the destination of the HTTP response) and the request destination information (target URL information) contained in the data of the HTTP response is stored in the request information storage unit 105. In other words, it is judged whether the HTTP response acquired by the response information acquiring unit 111 accords with the HTTP request judged to be the inspection target by the first target determining unit 102.

Then, if it is judged by the second target determining unit 112 that the HTTP response is the inspection target, the personal information judging unit 113 judges whether the data of the HTTP response contain the personal information (S62). If it is judged by the personal information judging unit 113 that the personal information is not contained (S62; NO), the suspending processing unit 118 deletes, from the request information storage unit 105, the information concerning the HTTP request corresponding to the HTTP response judged that the personal information is not contained (S63).

If it is judged by the second target determining unit 112 that the HTTP response is not the inspection target (S61; NO), and it is judged by the personal information judging unit 113 that the personal information is not contained (S62; NO), the suspending processing unit 118 transmits the HTTP response through the communication unit 11 without suspending it (S64).

If it is judged by the personal information judging unit 113 that the personal information is contained (S62; YES), the suspending processing unit 118 stores the data of the HTTP response in the response information storage unit 116 (S65). With this operation, the HTTP response is suspended so as not to be received by the client terminal 1 serving as the destination. After storing the data of the HTTP response in the response information storage unit 116, the suspending processing unit 118 transmits the request source information and the request destination information concerning the HTTP response to the counting unit 115.

The counting unit 115 counts the number of HTTP requests corresponding to the request source information and the request destination information transmitted from the suspending processing unit 118, on the basis of the information stored in the request information storage unit 105 (S66). In other words, the counting unit 115 counts the number of records containing the same request source information and the same request destination information as the information transmitted from the suspending processing unit 118 (S66).

The suspending processing unit 118 judges whether the number of the HTTP requests counted by the counting unit 115 exceeds a predetermined threshold value (S67). If the number of the HTTP requests exceeds the predetermined threshold value (S67; YES), the suspending processing unit 118 extracts, from the response information storage unit 116, the data of the HTTP response corresponding to the HTTP request serving as the target of counting (S68), and transmits the extracted data to the response processing unit 119. At this time, the suspending processing unit 118 deletes the extracted data of the HTTP response from the response information storage unit 116 (S68). Further, the suspending processing unit 118 deletes the information concerning the HTTP request serving as the target of counting from the request information storage unit 105 (S69).

Upon receiving the data of the HTTP response from the suspending processing unit 118, the response processing unit 119 applies the protection process to the data (S70). With this operation, the personal information contained in the HTTP response having this protection process applied thereto cannot be acquired by the client terminal 1 serving as the request source.

On the other hand, if the number of the HTTP requests does not exceed the predetermined threshold value (S67; NO), the suspending processing unit 118 terminates processing.

Figure 7:
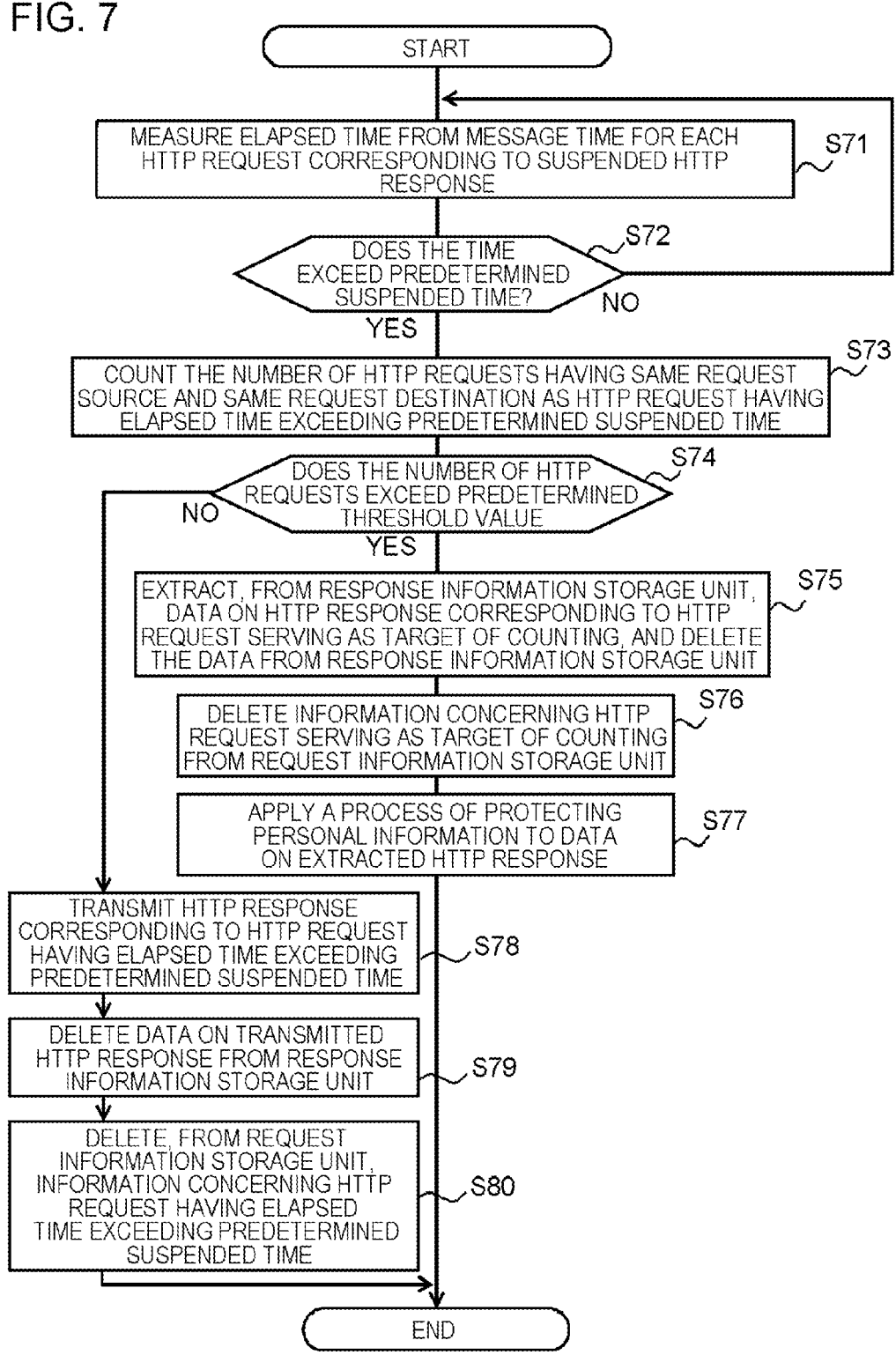
FIG. 7 is a flowchart showing an example of an operation in relation to a suspending timer of the information leakage prevention unit according to the first exemplary embodiment.

FIG. 7 is a flowchart showing an example of an operation in relation to the suspending timer 117 of the information leakage prevention unit 15 according to the first exemplary embodiment.

For each of the HTTP requests corresponding to the suspended HTTP responses, the suspending timer 117 measures the elapsed time from the message time (S71). Upon detecting that the elapsed time exceeds a predetermined suspended time (S72; YES), the suspending timer 117 notifies the suspending processing unit 118 of the request source information and the request destination information of the HTTP request having the elapsed time exceeding the predetermined suspended time, and also notifies the suspending processing unit 118 to that effect.

Upon receiving the notification described above from the suspending timer 117, the suspending processing unit 118 instructs the counting unit 115 to count the number of HTTP requests having the request source information and the request destination information notified by the suspending timer 117. In response to this instruction, the counting unit 115 counts the number of HTTP requests having the same request source and the same request destination as the HTTP request having the elapsed time exceeding the predetermined suspended time (S73).

The suspending processing unit 118 judges whether the number of the HTTP requests counted by the counting unit 115 exceeds a predetermined threshold value (S74). If the number of the HTTP requests exceeds the predetermined threshold value (S74; YES), the suspending processing unit 118 performs the process S75 and the process S76, and then, the response processing unit 119 performs the process S77. Since the processes S75, S76, and S77 are similar to the processes S68, S69, and S70 shown in FIG. 6, explanation thereof will be not repeated.

On the other hand, if the number of the HTTP requests does not exceed the predetermined threshold value (S74; NO), the suspending processing unit 118 extracts, from the response information storage unit 116, the data of the HTTP response corresponding to the HTTP request having the elapsed time exceeding the predetermined suspended time, and transmits the HTTP response through the communication unit 11 on the basis of the extracted data (S78).

Further, the suspending processing unit 118 deletes the data of the transmitted HTTP response from the response information storage unit 116 (S79), and deletes the information concerning the HTTP request having the elapsed time exceeding the predetermined suspended time from the request information storage unit 105 (S80).

[Operation and Effect of First Exemplary Embodiment]

As described above, in the first exemplary embodiment, once the HTTP request is received in the WEB server 10, the information concerning the HTTP request serving as the inspection target is stored in the request information storage unit 105 of the information leakage prevention unit 15. Judgment over whether or not the HTTP request is set to the inspection target is made using the request destination information such as URL information stored in advance in the target judging information storage unit 103. With this configuration, of the HTTP responses generated by the WEB application 12, only the HTTP response corresponding to the HTTP request to be stored in the request information storage unit 105 is set to the inspection target.

Thus, according to the first exemplary embodiment, the HTTP request and the HTTP response that should be set to the inspection target can be narrowed down only by storing, in the target judging information storage unit 103, the information on the request destination expected to return the HTTP response containing the personal information. With this configuration, it is possible to prevent an unnecessary increase in the processing load of the information leakage prevention unit 15 and immediately transmit, to the destination, the HTTP response that is less likely to contain the personal information, whereby it is possible to prevent the unnecessary response delay.

The transmission of the HTTP response judged by the personal information judging unit 113 to contain the personal information is suspended by the suspending processing unit 118. Of the HTTP responses suspended, the HTTP response corresponding to the HTTP request related to the same request source and the same request destination and transferred for more than predetermined threshold number of times within a predetermined suspended time is subjected to the protection process so that the personal information is not received by the client terminal 1 serving as the request source.

Thus, according to the first exemplary embodiment, it is possible to precisely detect the unauthorized access such as transmitting the large number of HTTP requests requesting the HTTP responses containing the personal information from the same request source within a certain period of time, and prevent the leakage of the personal information resulting from such an unauthorized access before it happens.

On the other hand, in the first exemplary embodiment, of the HTTP responses suspended, the HTTP response corresponding to the HTTP request related to the same request source and the same request destination and transferred for less than predetermined threshold number of times within the predetermined suspended time is transmitted after suspension. With this operation, the HTTP request requesting the personal information for the purpose of business operation or other authorized purposes is not judged as the unauthorized access, and hence, the HTTP response made in response to the authorized access is appropriately delivered to the request source even if the HTTP response contains the personal information.

Thus, according to the first exemplary embodiment, it is possible to prevent the leakage of the personal information through the unauthorized access before it happens without mixing the authorized access requesting the personal information and the unauthorized access.

[Second Exemplary Embodiment]

In the first exemplary embodiment described above, the unauthorized access is detected on the basis of the relationship between the HTTP request and the HTTP response, whereby the personal information in the HTTP response serving as the response to the unauthorized access is protected. In a second exemplary embodiment, the unauthorized access is detected only on the basis of the HTTP response. Below, a WEB server device 10 according to the second exemplary embodiment will be described with focus being placed on things different from the first exemplary embodiment, and the explanation of details same as the first exemplary embodiment will not be repeated.

[Device Configuration]

Figure 8:
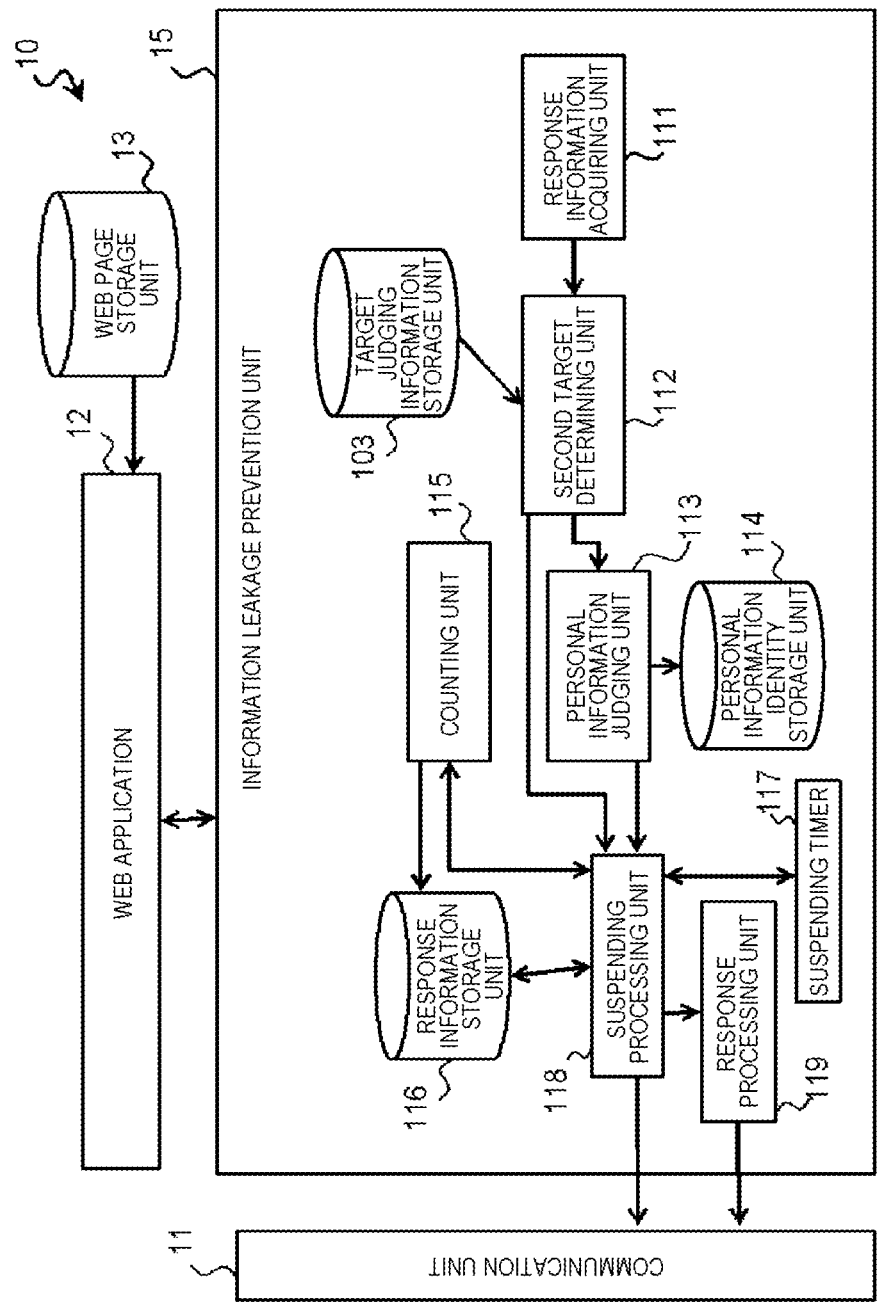
FIG. 8 is a schematic view illustrating an example of a configuration of a WEB server according to a second exemplary embodiment.

FIG. 8 is a schematic view illustrating an example of a configuration of the WEB server 10 according to the second exemplary embodiment. In the second exemplary embodiment, only the configuration of the information leakage prevention unit 15 is different from that in the first exemplary embodiment. The information leakage prevention unit 15 according to the second exemplary embodiment is formed by each of the processing units in the response processing system 18 and the target judging information storage unit 103 according to the first exemplary embodiment.

In addition to the information indicated in the first exemplary embodiment, the response information acquiring unit 111 acquires HTTP response data containing a message time related to a HTTP response. The message time indicates, for example, a point in time when the HTTP response is received by the response information acquiring unit 111 (date and time information). In the case where information on a transmission time is contained in the HTTP response, it may be possible to use the transmission time as the message time.

The target judging information storage unit 103 stores request destination information for limiting the HTTP response that should be set to the inspection target in the information leakage prevention unit 15. This limiting information includes, for example, request destination information (URL) for identifying a WEB page containing the personal information. Note that, in this exemplary embodiment, this limiting information is not only the URL. This limiting information may be the IP address of the WEB server 10, or may be other information such as a parameter value attached to the URL.

The second target determining unit 112 uses the request destination information stored in the target judging information storage unit 103 to identify the HTTP response that should be inspected in the information leakage prevention unit 15. More specifically, the second target determining unit 112 judges whether the request destination information matching the request destination information (information concerning the response source) contained in the data of the HTTP response acquired by the response information acquiring unit 111 is stored in the target judging information storage unit 103. If such request destination information is stored in the target judging information storage unit 103, the second target determining unit 112 determines that the HTTP response should be set to the inspection target. Other processes in the second target determining unit 112 are similar to those in the first exemplary embodiment.

The counting unit 115 counts the number of HTTP responses having the same request source information and the same request destination information on the basis of the data of the HTTP response stored in the response information storage unit 116.

As in the first exemplary embodiment, the response information storage unit 116 stores the data of the HTTP response suspended so as not to be received by the client terminal 1 serving as the destination. In the second exemplary embodiment, the data of the HTTP response contain the message time related to the HTTP response as described above.

For each of the HTTP responses suspended, the suspending timer 117 measures the elapsed time from the message time. Once the elapsed time is more than or equal to a predetermined suspended time retained in advance, the suspending timer 117 notifies the suspending processing unit 118 of the request source information and the request destination information of the HTTP response having the elapsed time reaching the predetermined suspended time or more, and also notifies the suspending processing unit 118 to that effect.

After storing the data of the HTTP response in the response information storage unit 116, the suspending processing unit 118 instructs the counting unit 115 to count the number of HTTP responses having the same request source information and the same request destination information as that of the above-described HTTP response. If the number of the HTTP responses counted by the counting unit 115 in response to this instruction exceeds the predetermined threshold value retained in advance, the suspending processing unit 118 extracts the data of the HTTP response serving as the target of counting from the response information storage unit 116, and transmits the extracted data to the response processing unit 119. At this time, the suspending processing unit 118 deletes the extracted data of the HTTP response from the response information storage unit 116.

Further, upon receiving, from the suspending timer 117, the notification that the predetermined suspended time elapses, the suspending processing unit 118 instructs the counting unit 115 to count the number of HTTP responses having the request source information and the request destination information notified from the suspending timer 117. If the number of the HTTP responses counted by the counting unit 115 in response to the above-described instruction does not exceed the predetermined threshold value retained in advance, the suspending processing unit 118 cancels the suspension of the HTTP response for which the predetermined suspended time elapses. The processes at the time of cancelling the suspension of the HTTP response are similar to those in the first exemplary embodiment.

[Example of Operation]

Below, an example of an operation performed by the information leakage prevention unit 15 according to the second exemplary embodiment will be described with reference to FIG. 9 and FIG. 10. Here, the description will be focused on operations different from those in the first exemplary embodiment, and the explanation of operations similar to those in the first exemplary embodiment will not be repeated.

Figure 9:
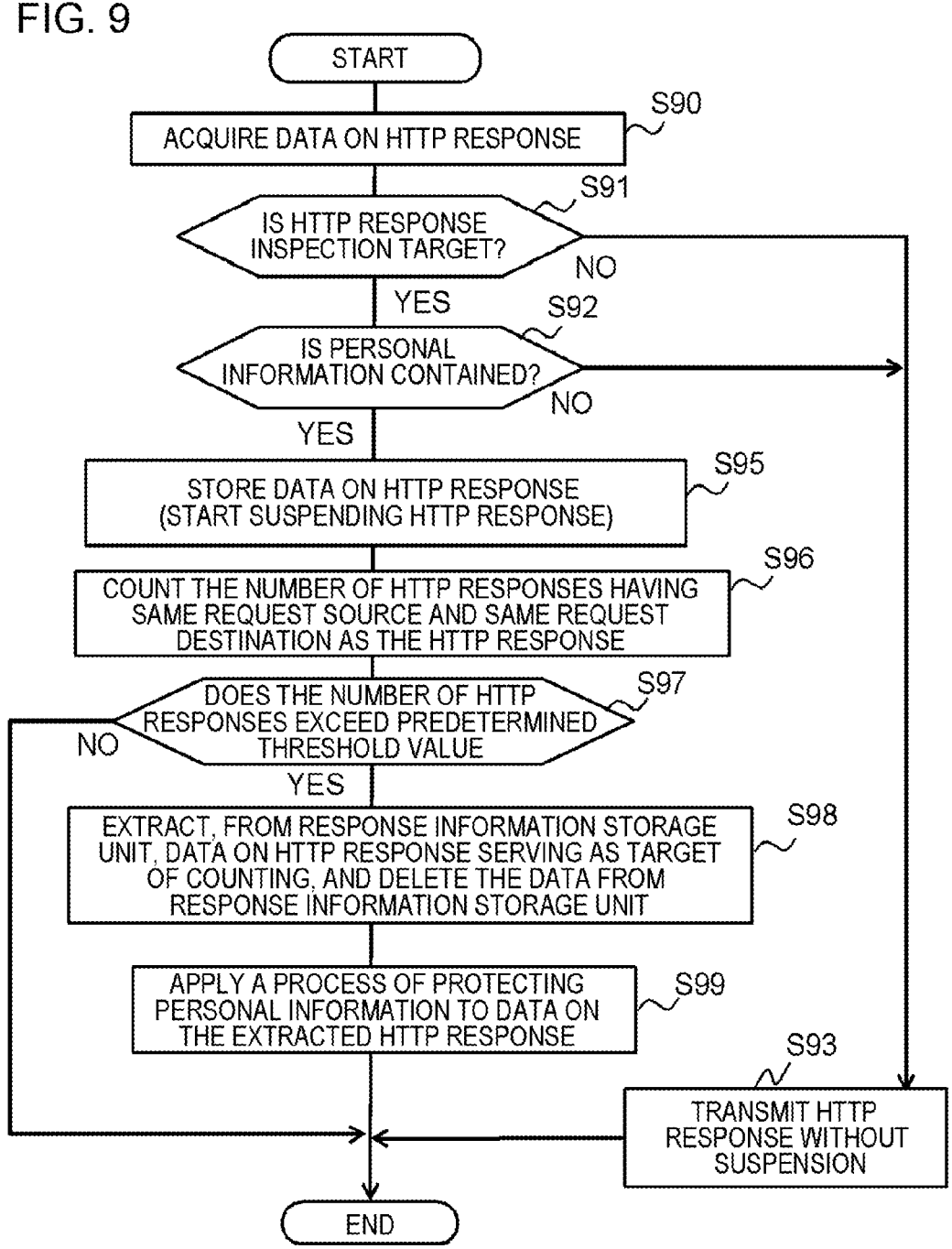
FIG. 9 is a flowchart showing an example of an operation performed by an information leakage prevention unit according to the second exemplary embodiment at the time of acquiring data on a HTTP response.

FIG. 9 is a flowchart showing an example of an operation performed by the information leakage prevention unit 15 according to the second exemplary embodiment at the time of acquiring data on a HTTP response.

In the information leakage prevention unit 15, the response information acquiring unit 111 acquires the data of the generated HTTP response (S90). In the second exemplary embodiment, the acquired data contain the message time related to the HTTP response.

On the basis of the judgment over whether the information matching the request destination information contained in the data acquired by the response information acquiring unit 111 is stored in the target judging information storage unit 103, the second target determining unit 112 judges whether the HTTP response should be set to the inspection target (S91).

Here, the request destination information represents, for example, URL information serving as the target of HTTP response.

Then, if the HTTP response is judged by the second target determining unit 112 to be the inspection target, the personal information judging unit 113 judges whether the data of the HTTP response contain the personal information (S92).

If the HTTP response is not judged by the second target determining unit 112 to be the inspection target (S91; NO), and is judged by the personal information judging unit 113 as not containing the personal information (S92; NO), the suspending processing unit 118 transmits the HTTP response through the communication unit 11 without suspending it (S93).

If the HTTP response is judged by the personal information judging unit 113 to contain the personal information (S92; YES), the suspending processing unit 118 stores the data of this HTTP response in the response information storage unit 116 (S95). With this operation, this HTTP response is suspended so as not to be received by the client terminal 1 serving as the destination. After storing the data of this HTTP response in the response information storage unit 116, the suspending processing unit 118 transmits the request source information and the request destination information concerning this HTTP response to the counting unit 115.

The counting unit 115 counts the number of HTTP responses having the request source information and the request destination information transmitted from the suspending processing unit 118 in the suspended HTTP responses on the basis of the data stored in the response information storage unit 116 (S96).

The suspending processing unit 118 judges whether the number of the HTTP responses counted by the counting unit 115 exceeds the predetermined threshold value (S97). If the number of the HTTP responses does not exceed the predetermined threshold value (S97; NO), the suspending processing unit 118 terminates the process.

On the other hand, if the number of the HTTP responses exceeds the predetermined threshold value (S97; YES), the suspending processing unit 118 extracts the data of the HTTP response serving as the target of counting from the response information storage unit 116 (S98), and transmits the extracted data to the response processing unit 119. At this time, the suspending processing unit 118 deletes the extracted data of the HTTP response from the response information storage unit 116 (S98).

Upon receiving the data of the HTTP response from the suspending processing unit 118, the response processing unit 119 applies the protection process to the data (S99). With this operation, the personal information contained in the HTTP response having this protection process applied thereto is not acquired by the client terminal 1 serving as the request source.

Figure 10:
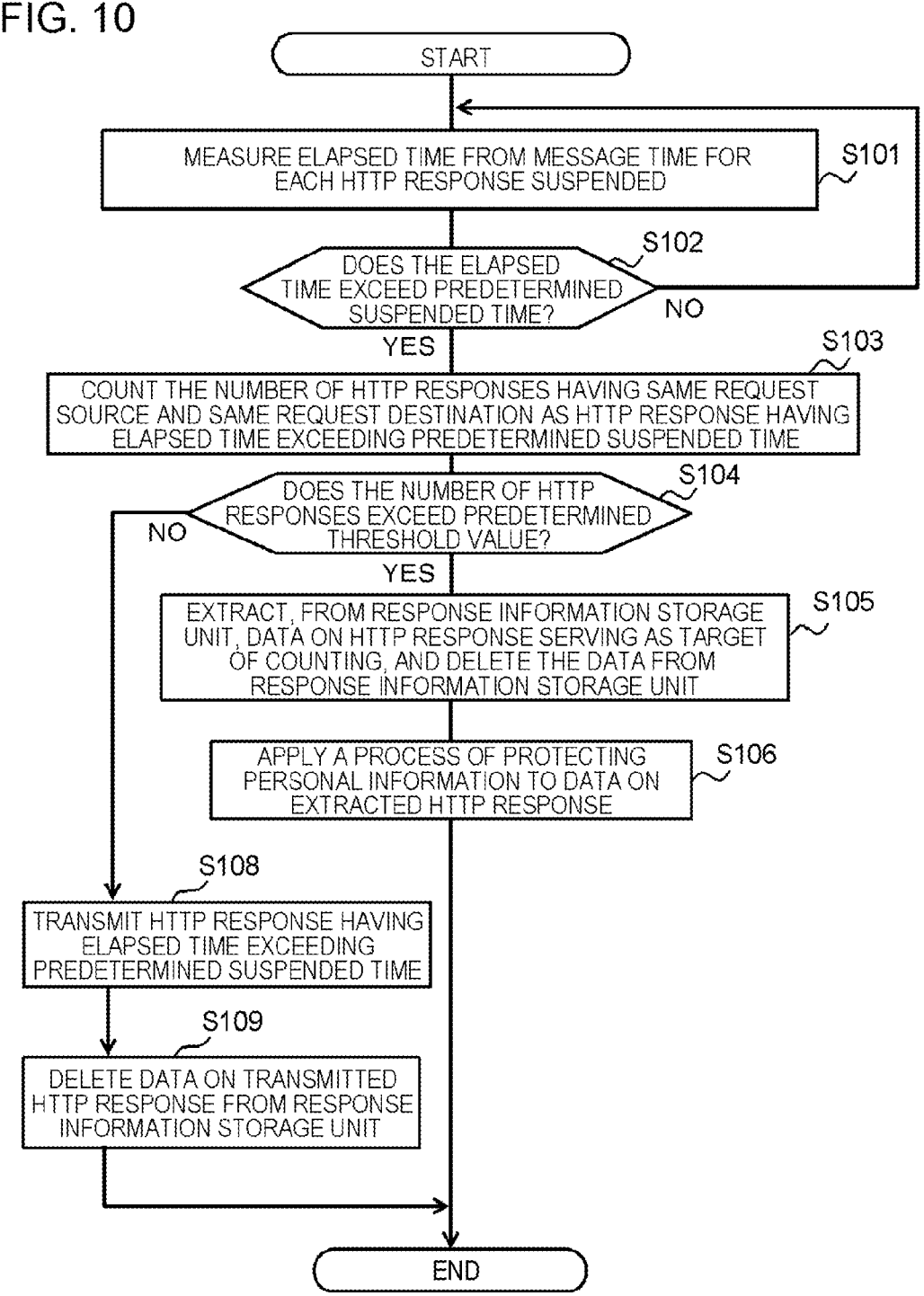
FIG. 10 is a flowchart showing an example of an operation in relation to a suspending timer of the information leakage prevention unit according to the second exemplary embodiment.

FIG. 10 is a flowchart showing an example of an operation in relation to the suspending timer 117 of the information leakage prevention unit 15 according to the second exemplary embodiment.

For each of the HTTP responses suspended, the suspending timer 117 measures the elapsed time from the message time (S101). Upon detecting that the elapsed time exceeds the predetermined suspended time (S102; YES), the suspending timer 117 notifies the suspending processing unit 118 of the request source information and the request destination information of the HTTP response having the elapsed time exceeding the predetermined suspended time, and further notifies the suspending processing unit 118 to that effect.

Upon receiving the notification from the suspending timer 117, the suspending processing unit 118 instructs the counting unit 115 to count the number of HTTP responses having the request source information and the request destination information notified by the suspending timer 117. In response to this instruction, the counting unit 115 counts the number of HTTP responses having the same request source and the same request destination as the HTTP response having the elapsed time exceeding the predetermined suspended time in the HTTP responses suspended (S103).

The suspending processing unit 118 judges whether the number of the HTTP responses counted by the counting unit 115 exceeds the predetermined threshold value (S104). If the number of the HTTP responses exceeds the predetermined threshold value (S104; YES), the suspending processing unit 118 performs the process 5105, and then, the response processing unit 119 performs the process S106. The processes 5105 and 5106 are similar to those in the processes S98 and S99 shown in FIG. 9, and hence, explanation thereof will not be repeated.

On the other hand, if the number of the HTTP requests does not exceed the predetermined threshold value (S104; NO), the suspending processing unit 118 extracts the data of the HTTP response having the elapsed time exceeding the predetermined suspended time from the response information storage unit 116, and transmits the HTTP response through the communication unit 11 on the basis of the extracted data (S108). Further, the suspending processing unit 118 deletes the data of the transmitted HTTP response from the response information storage unit 116 (S109).

[Operation and Effect of Second Exemplary Embodiment]

As described above, in the second exemplary embodiment, once the data of the HTTP response generated by the WEB application 12 are acquired by the response information acquiring unit 111 of the information leakage prevention unit 15, the judgment over whether this HTTP response should be set to the inspection target or not is made by the second target determining unit 112. With this operation, only the HTTP response containing the request destination information matching the request destination information stored in the target judging information storage unit 103 is set to the inspection target.

Thus, as in the first exemplary embodiment, according to the second exemplary embodiment, the HTTP response that should be set to the inspection target can be limited, and further, it is possible to prevent the unnecessary increase in the processing load of the information leakage prevention unit 15, and to prevent the unnecessary response delay.

In the second exemplary embodiment, the transmission of the HTTP response judged by the personal information judging unit 113 to contain the personal information is suspended by the suspending processing unit 118. Of the HTTP responses suspended, the HTTP responses related to the same request source and the same request destination and whose total number acquired within the predetermined suspended time exceeds the predetermined threshold number is subjected to the protection process so that the personal information is not received by the client terminal 1 serving as the request source.

As described above, in the second exemplary embodiment, in the case where the large number of HTTP responses containing the personal information and related to the same request source and the same request destination is generate within a certain period of time, these HTTP responses are judged to be a response to the unauthorized access. Thus, according to the second exemplary embodiment, it is possible to reliably detect the response to the unauthorized access before it is transferred to the client serving as the destination, and prevent the leakage of the personal information due to the unauthorized access before it happens.

Further, in the second exemplary embodiment, of the HTTP responses suspended, the HTTP responses related to the same request source and the same request destination and whose total number generated within the predetermined suspended time does not exceed the predetermined threshold value are suspended and then transmitted. Thus, as in the first exemplary embodiment, in the second exemplary embodiment, it is possible to prevent only the leakage of the personal information due to the unauthorized access without confusing the authorized access asking for the personal information with the unauthorized access.

[Modification Example]

The first exemplary embodiment and the second exemplary embodiment described above give an example in which the unauthorized user acquires the personal information through the HTTP from the WEB server 10 in an unauthorized manner. However, the method of acquiring the personal information by the unauthorized user is not limited to the HTTP. A simple mail transfer protocol (SMTP) or other protocols may be used.

Figure 11:
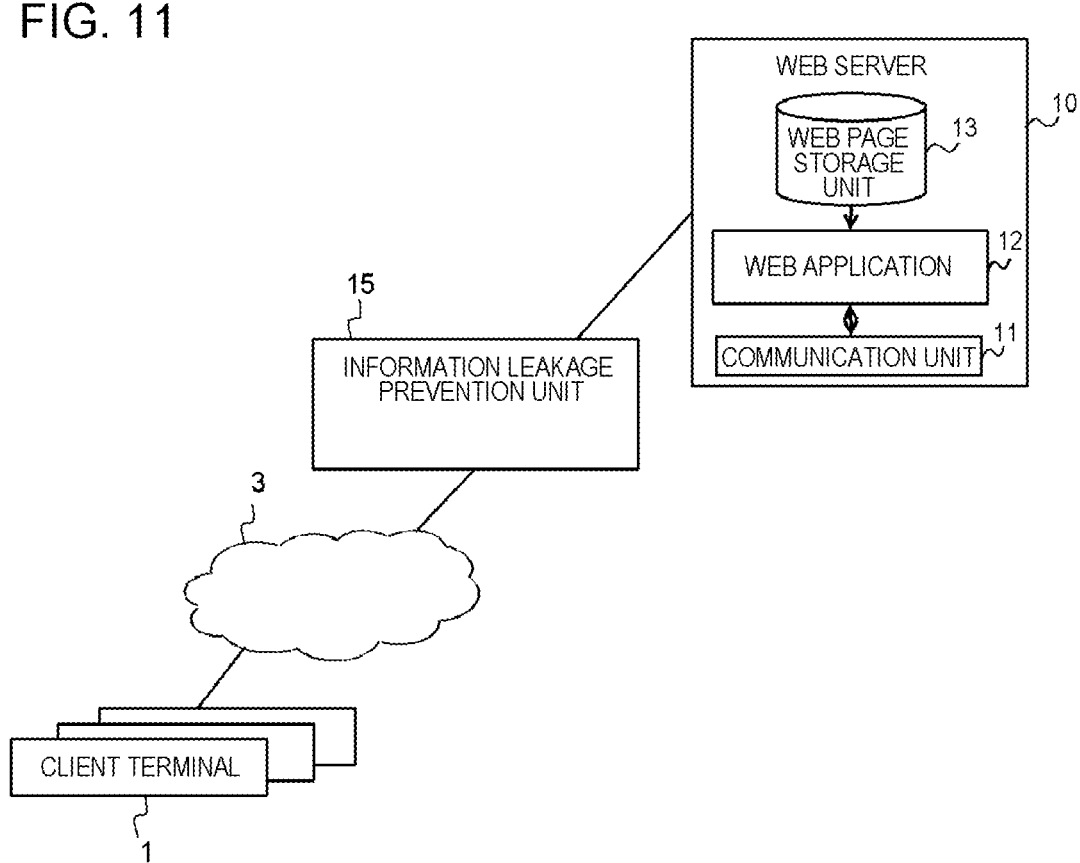
FIG. 11 is a schematic view illustrating a configuration of a modification example of the WEB system.

Further, the first exemplary embodiment and the second exemplary embodiment described above give an example in which the information leakage prevention unit 15 is provided in the WEB server 10. However, the information leakage prevention unit 15 is realized as a computer provided separately from the WEB server 10. FIG. 11 is a schematic view illustrating a configuration of a modification example of the WEB system. As illustrated in FIG. 11, in this WEB system according to this modification example, the information leakage prevention unit 15 is disposed between the WEB server 10 and the client terminal 1.

In the modification example, it may be possible to employ a configuration in which the request information acquiring unit 101 receives, on the network 3, the HTTP request transmitted from the client terminal 1, and the response information acquiring unit 111 acquires the HTTP response from the WEB server 10 or receives, through the network 3, the HTTP response transmitted by the WEB server 10. At this time, the response information acquiring unit 111 receives this HTTP response transmitted from the WEB server 10 so that this HTTP response is not received by the client terminal 1 serving as the destination.

It should be noted that the plural flowcharts used in the description above show plural steps (processes) in a sequential order. However, the order of the process steps performed in the exemplary embodiments is not limited to the order of the steps shown. In the exemplary embodiments, the order of the process steps illustrated in the drawings may be exchanged, provided that the exchange does not impair the details of the processes. Further, the above-described exemplary embodiments and the modification example may be combined, provided that the details thereof do not contradict each other.

(Supplemental Note 1)

A device for preventing information leakage, including:

a request information storage unit that stores a message time, request source information, and request destination information in relation to each information requesting message transmitted from a client terminal to a server device;

a suspending processing unit that suspends a response message containing personal information in response messages transmitted from the server device in response to the information requesting messages, for a predetermined suspended time from a message time of the corresponding information requesting message;

a counting unit that, on the basis of information concerning the information requesting message stored in the request information storage unit, counts the number of information requesting messages transmitted from the same request source to the same request destination and corresponding to the suspended response message; and a response processing unit that, in the case where the number of the information requesting messages counted by the counting unit exceeds a predetermined threshold value, applies a protection process to the suspended response message so that the personal information contained in the suspended response message is not received by the client terminal serving as the request source.

(Supplemental Note 2)

The device for preventing information leakage according to Supplemental Note 1 further including:

a personal information judging unit that judges whether the response message contains the personal information, in which the suspending processing unit deletes, from the request information storage unit, information concerning the information requesting message corresponding to the response message judged by personal information judging unit as not containing the personal information and outputs the response message not containing the personal information without suspending the response message whereas the suspending processing unit suspends the response message judged by the personal information judging unit to contain the personal information.

(Supplemental Note 3)

The device for preventing information leakage according to Supplemental Note 2, in which the suspending processing unit cancels the suspension of the response message corresponding to the information requesting message, and deletes the information concerning the information requesting message from the request information storage unit in the case where the number of the information requesting messages counted by the counting unit does not exceed the predetermined threshold value, and an elapsed time from the message time stored in the request information storage unit and related to the information requesting message corresponding to the suspended response message is more than or equal to the predetermined suspended time.

(Supplemental Note 4)

The device for preventing information leakage according to Supplemental Note 2 or 3, further including:

a request information acquiring unit that acquires information concerning the information requesting message;

a first target determining unit that stores, in the request information storage unit, only the information concerning the information requesting message containing request destination information matching predetermined request destination information stored in advance, in the information concerning the information requesting message acquired by the request information acquiring unit; and a second target determining unit that determines a response message other than the response message in response to the information requesting message having the request source information and the request destination information stored in the request information storage unit, from among the response messages transmitted from the server device, to be a response message outside a target of inspection, in which the personal information judging unit does not judge the response message outside the target of inspection, and the suspending processing unit deletes, from the request information storage unit, information concerning information requesting message corresponding to the response message outside the target of inspection, and outputs the response message outside the target of inspection without suspending it.

(Supplemental Note 5)

A device for preventing information leakage, including:

a suspending processing unit that suspends a response message containing personal information in response messages transmitted from a server device in response to information requesting messages transmitted from a client terminal to the server device, for a predetermined suspended time from a message time related to each response message;

a counting unit that counts the number of response messages related to the same request source and the same request destination in the suspended response message; and a response processing unit that, in the case where the number of the response messages counted by the counting unit exceeds a predetermined threshold value, applies a protection process to the suspended response message so that the personal information contained in the suspended response message is not received by the client terminal serving as the request source.

(Supplemental Note 6)

The device for preventing information leakage according to Supplemental Note 5, further including:

a personal information judging unit that judges whether the response message contains the personal information, in which the suspending processing unit outputs the response message judged by the personal information judging unit as not containing the personal information without suspending the response message whereas the suspending processing unit suspends the response message judged by the personal information judging unit to contain the personal information.

(Supplemental Note 7)

The device for preventing information leakage according to Supplemental Note 6, in which in the case where the number of the response messages counted by the counting unit does not exceed the predetermined threshold value, and an elapsed time from the message time related to the suspended response message is more than or equal to the predetermined suspended time, the suspending processing unit cancels the suspension of the response message having the elapsed time more than or equal to the predetermined suspended time.

(Supplemental Note 8)

The device for preventing information leakage according to any one of Supplemental Notes 1 to 7, in which as the protection process, the response processing unit does not output the suspended response message, or applies a process of deleting the personal information to the suspended response message or a process of editing the personal information to the suspended response message, and then, outputs the response message having the process applied thereto.

(Supplemental Note 9)

A method for preventing information leakage, in which a computer:

stores, in a request information storage unit, a message time, request source information, and request destination information in relation to each information requesting message transmitted from a client terminal to a server device;

suspends a response message containing personal information in response messages transmitted from the server device in response to the information requesting messages, for a predetermined suspended time from a message time of the corresponding information requesting message;

counts the number of information requesting messages transmitted from the same request source to the same request destination and corresponding to the suspended response message, on the basis of information concerning the information requesting message stored in the request information storage unit; and in a case where the counted number of the information requesting messages exceeds a predetermined threshold value, applies a protection process to the response message so that the personal information contained in the suspended response message is not received by the client terminal serving as the request source.

(Supplemental Note 10)

The method for preventing information leakage according to Supplemental Note 9, in which the computer further:

judges whether the response message contains the personal information, and said suspending the response message includes:

deleting, from the request information storage unit, the information concerning the information requesting message corresponding to the response message judged as not containing the personal information;

outputting the response message not containing the personal information without suspending the response message; and suspending the response message judged to contain the personal information.

(Supplemental Note 11)

The method for preventing information leakage according to Supplemental Note 10, in which said suspending the response message includes cancelling the suspension of the response message corresponding to the information requesting message and deleting information concerning the information requesting message from the request information storage unit in the case where the counted number of the information requesting messages does not exceed the predetermined threshold value and the elapsed time from the message time stored in the request information storage unit and related to the information requesting message corresponding to the suspended response message is more than or equal to the predetermined suspended time.

(Supplemental Note 12)

The method for preventing information leakage according to Supplemental Note 10 or 11, in which the computer further:

acquires information concerning the information requesting message;

stores, in the request information storage unit, only the information concerning the information requesting message containing request destination information matching predetermined request destination information stored in advance, in the information concerning the acquired information requesting message; and determines the response message other than the response message corresponding to the information requesting message having the request source information and the request destination information stored in the request information storage unit from among the response messages transmitted from the server device, to be a response message outside a target of inspection, said judging whether the response message contains the personal information does not judge the response message outside the target of inspection, and said suspending the response message includes deleting information concerning the information requesting message corresponding to the response message outside the target of inspection from the request information storage unit and outputting the response message outside the target of inspection without suspending it.

(Supplemental Note 13)

A program that causes a computer to realize:

a request information storage unit that stores a message time, request source information, and request destination information in relation to each information requesting message transmitted from a client terminal to a server device;

a suspending processing unit that suspends a response message containing personal information in response messages transmitted from the server device in response to the information requesting messages, for a predetermined suspended time from a message time of the corresponding information requesting message;

a counting unit that, on the basis of information concerning the information requesting message stored in the request information storage unit, counts the number of information requesting messages transmitted from the same request source to the same request destination and corresponding to the suspended response message; and a response processing unit that, in the case where the number of the information requesting messages counted by the counting unit exceeds a predetermined threshold value, applies a protection process to the response message so that the personal information contained in the suspended response message is not received by the client terminal serving as the request source.

(Supplemental Note 14)

A method for preventing information leakage in which a computer:

suspends a response message containing personal information in response messages transmitted from a server device in response to information requesting messages transmitted from a client terminal to the server device, for a predetermined suspended time from a message time related to each response message;

counts the number of response messages related to the same request source and the same request destination in the suspended response message; and in the case where the counted number of the response messages exceeds a predetermined threshold value, applies a protection process to the suspended response message so that the personal information contained in the suspended response message is not received by the client terminal serving as the request source.

(Supplemental Note 15)

A method for preventing information leakage according to Supplemental Note 14, in which the computer further:

judges whether the response message contains personal information, and said suspending the response message includes:

outputting the response message judged as not containing the personal information without suspending it; and suspending the response message judged to contain the personal information.

(Supplemental Note 16)

A method for preventing information leakage according to Supplemental Note 15, in which in the case where the counted number of the response message does not exceed the predetermined threshold value and an elapsed time from the message time related to the suspended response message is more than or equal to the predetermined suspended time, said suspending the response message includes cancelling the suspension of the response message having the elapsed time more than or equal to the predetermined suspended time.

(Supplemental Note 17)

The method for preventing information leakage according to any one of Supplemental Notes 9 to 12 and Supplemental Notes 14 to 16, in which the protection process applied to the response message does not output the suspended response message, or applies a process of deleting the personal information or a process of editing the personal information to the suspended response message, and then outputting the response message having the process applied thereto.

(Supplemental Note 18)

A program that causes a computer to realize:

a suspending processing unit that suspends a response message containing personal information in response messages transmitted from a server device in response to information requesting messages transmitted from a client terminal to the server device, for a predetermined suspended time from a message time related to each response message;

a counting unit that counts the number of response messages related to the same request source and the same request destination in the suspended response message; and a response processing unit that, in the case where the number of the response messages counted by the counting unit exceeds a predetermined threshold value, applies a protection process to the response message so that the personal information contained in the suspended response message is not received by a client terminal serving as the request source.

The present application claims priority based on Japanese Patent Application No. 2011-67315 filed in Japan on Mar. 25, 2011, the disclosures of which are incorporated herein by reference in their entirety.

The invention claimed is:

1. A device for preventing information leakage, comprising:
   a request information storage configured to store a message time, request source information, and request destination information in relation to each information requesting message transmitted from a client terminal to a server device;
   at least one memory operable to store program code; and
   at least one hardware processor operable to read said program code and operate as instructed by said program code, said program code comprising:
      suspending processing code configured to suspend a response message containing personal information in response messages transmitted from the server device in response to the information requesting messages, for a predetermined suspended time from the message time of the corresponding information requesting message, and output a response message not containing the personal information in the response messages without suspending the response message not containing the personal information;
      counting code configured to, based on information concerning the information requesting message stored in the request information storage, count the number of information requesting messages indicating a same request source and a same request destination and corresponding to the suspended response message containing the personal information; and
      response processing code configured to, in a case where the number of the information requesting messages counted by the counting code exceeds a predetermined threshold value, apply a protection process to the suspended response message so the personal information contained in the suspended response message is not received by the client terminal serving as the request source.

2. The device for preventing information leakage according to claim 1, said program code further comprising:
   personal information judging code configured to judge whether the response message contains the personal information, wherein
   the suspending processing code deletes, from the request information storage, information concerning the information requesting message corresponding to the response message judged by personal information judging code as not containing the personal information and suspends the response message judged by the personal information judging code to contain the personal information.

3. The device for preventing information leakage according to claim 2, wherein
   the suspending processing code cancels the suspension of the response message corresponding to the information requesting message, and deletes the information concerning the information requesting message from the request information storage in a case where the number of the information requesting messages counted by the counting code does not exceed the predetermined threshold value, and an elapsed time from the message time stored in the request information storage and related to the information requesting message corresponding to the suspended response message is more than or equal to the predetermined suspended time.

4. The device for preventing information leakage according to claim 2, said program code further comprising:
   request information acquiring code configured to acquire information concerning the information requesting message;
   first target determining code configured to store, in the request information storage, only the information concerning the information requesting message containing request destination information matching predetermined request destination information stored in advance, in the information concerning the information requesting message acquired by the request information acquiring code; and
   second target determining code configured to determine a response message other than the response message in response to the information requesting message having the request source information and the request destination information stored in the request information storage, from among the response messages transmitted from the server device, to be a response message outside a target of inspection, wherein
   the personal information judging code does not judge the response message outside the target of inspection, and
   the suspending processing code deletes, from the request information storage, information concerning information requesting message corresponding to the response message outside the target of inspection, and outputs the response message outside the target of inspection without suspending the response message outside the target of inspection.

5. A device for preventing information leakage, comprising:
   at least one memory operable to store program code; and
   at least one hardware processor operable to read said program code and operate as instructed by said program code, said program code comprising:

suspending processing code configured to suspend a response message containing personal information in response messages transmitted from a server device in response to information requesting messages transmitted from a client terminal to the server device, for a predetermined suspended time from a message time related to each response message, and output a response message not containing the personal information in the response messages without suspending the response message not containing the personal information;

counting code configured to count the number of response messages related to a same request source and a same request destination in the suspended response message containing the personal information; and response processing code configured to, in a case where the number of the response messages counted by the counting code exceeds a predetermined threshold value, apply a protection process to the suspended response message so the personal information contained in the suspended response message is not received by the client terminal serving as the request source.

6. The device for preventing information leakage according to claim 5, said program code further comprising:

personal information judging code configured to judge whether the response message contains the personal information, wherein the suspending processing code suspends the response message judged by the personal information judging code to contain the personal information.

7. The device for preventing information leakage according to claim 6, wherein in a case where the number of the response messages counted by the counting code does not exceed the predetermined threshold value, and an elapsed time from the message time related to the suspended response message is more than or equal to the predetermined suspended time, the suspending processing code cancels the suspension of the response message having the elapsed time more than or equal to the predetermined suspended time.

8. The device for preventing information leakage according to claim 1, wherein as the protection process, the response processing code does not output the suspended response message, or applies a process of deleting the personal information to the suspended response message or a process of editing the personal information to the suspended response message, and then, outputs the response message to which the process is applied.

9. A method for preventing information leakage, which is executed by a computer, the method including:

storing, in a request information storage, a message time, request source information, and request destination information in relation to each information requesting message transmitted from a client terminal to a server device;

suspending a response message containing personal information in response messages transmitted from the server device in response to the information requesting messages, for a predetermined suspended time from a message time of the corresponding information requesting message, and outputting a response message not containing the personal information in the response messages without suspending the response message not containing the personal information;

counting the number of information requesting messages indicating a same request source and a same request destination and corresponding to the suspended response message containing the personal information, based on information concerning the information requesting message stored in the request information storage; and in a case where the counted number of the information requesting messages exceeds a predetermined threshold value, applying a protection process to the suspended response message so the personal information contained in the suspended response message is not received by the client terminal serving as the request source.

10. A non-transitory computer-readable storage medium storing a program for causing the computer to realize:

a request information storage that stores a message time, request source information, and request destination information in relation to each information requesting message transmitted from a client terminal to a server device;

a suspending processor that suspends a response message containing personal information in response messages transmitted from the server device in response to the information requesting messages, for a predetermined suspended time from the message time of the corresponding information requesting message, and outputs a response message not containing the personal information in the response messages without suspending the response message not containing the personal information;

a counter that, based on information concerning the information requesting message stored in the request information storage, counts the number of information requesting messages indicating a same request source and a same request destination and corresponding to the suspended response message containing the personal information; and a response processor that, in a case where the number of the information requesting messages counted by the counter exceeds a predetermined threshold value, applies a protection process to the suspended response message so the personal information contained in the suspended response message is not received by the client terminal serving as the request source.

11. A method for preventing information leakage, which is executed by a computer, the method including:

suspending a response message containing personal information in response messages transmitted from a server device in response to information requesting messages transmitted from a client terminal to the server device, for a predetermined suspended time from a message time related to each response message, and outputting a response message not containing the personal information in the response messages without suspending the response message not containing the personal information;

counting the number of response messages related to a same request source and a same request destination in the suspended response message containing the personal information; and in a case where the counted number of the response messages exceeds a predetermined threshold value, applying a protection process to the suspended response message so the personal information contained in the suspended response message is not received by the client terminal serving as a request source.

12. A non-transitory computer-readable storage medium storing a program for causing the computer to realize:
- a suspending processor that suspends a response message containing personal information in response messages transmitted from a server device in response to information requesting messages transmitted from a client terminal to the server device, for a predetermined suspended time from a message time related to each response message, and outputs a response message not containing the personal information in the response messages without suspending the response message not containing the personal information;
- a counter that counts the number of response messages related to a same request source and a same request destination in the suspended response message containing the personal information; and
- a response processor that, in a case where the number of the response messages counted by the counter exceeds a predetermined threshold value, applies a protection process to the suspended response message so the personal information contained in the suspended response message is not received by a client terminal serving as the request source.

* * * * *